United States Patent
Kaemmerer

(10) Patent No.: US 11,343,558 B1
(45) Date of Patent: May 24, 2022

(54) SYSTEMS, METHODS, AND MEDIA FOR PROVIDING AN ENHANCED REMOTE CONTROL THAT SYNCHRONIZES WITH MEDIA CONTENT PRESENTATION

(71) Applicant: Google LLC, Mountain View, CA (US)

(72) Inventor: Dan Kaemmerer, San Bruno, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/095,285

(22) Filed: Nov. 11, 2020

(51) Int. Cl.
  *H04N 5/44* (2011.01)
  *H04N 21/422* (2011.01)
  *H04N 21/24* (2011.01)
  *H04N 21/443* (2011.01)
  *H04N 21/41* (2011.01)
  *H04N 21/2747* (2011.01)

(52) U.S. Cl.
  CPC ......... *H04N 21/42206* (2013.01); *H04N 21/2404* (2013.01); *H04N 21/2747* (2013.01); *H04N 21/41265* (2020.08); *H04N 21/4436* (2013.01)

(58) Field of Classification Search
  CPC ......... H04N 21/42206; H04N 21/2747; H04N 21/41265; H04N 21/4436; H04N 21/2404
  USPC .......................................................... 348/734
  See application file for complete search history.

(56) References Cited

U.S. PATENT DOCUMENTS

| | | | | |
|---|---|---|---|---|
| 3,811,090 A | * | 5/1974 | Uchida | H04W 52/0241 348/730 |
| 4,331,977 A | * | 5/1982 | Cohn | H04N 5/63 348/725 |
| 4,439,784 A | * | 3/1984 | Furukawa | H04N 7/17363 340/4.37 |

(Continued)

FOREIGN PATENT DOCUMENTS

| | | |
|---|---|---|
| CN | 205961343 | 2/2017 |
| WO | 0150751 | 7/2001 |

(Continued)

OTHER PUBLICATIONS

International Search Report and Written Opinion dated Mar. 4, 2022 in International Patent Application Mo. PCT/US2021/058939.

*Primary Examiner* — Michael B. Pierorazio
(74) *Attorney, Agent, or Firm* — Byrne Poh LLP

(57) ABSTRACT

Systems, methods, and media for providing an enhanced remote control that synchronizes with media content presentation are provided. In some embodiments, the method for presenting and inhibiting media content includes: receiving, using a hardware processor, a request to execute a media application for presenting media content on a media device, wherein the media application is associated with user preference settings that indicate a threshold amount of time for viewing media content and wherein the media device is controlled by a remote control device; causing, using the hardware processor, presentation of a media content item to begin; determining, using the hardware processor, whether the timing parameter for viewing media content from the (Continued)

user preference settings has been met; and, in response to determining that the timing parameter for viewing media content has been met, causing, using the hardware processor, the media application executing on the media device to end the presentation of the media content item and transmitting, using the hardware processor, a message to the remote control that disables the remote control from controlling the media device.

20 Claims, 4 Drawing Sheets

(56) References Cited

U.S. PATENT DOCUMENTS

| | | | | |
|---|---|---|---|---|
| 5,475,364 | A * | 12/1995 | Kenet | G08B 13/19 340/522 |
| 6,002,380 | A * | 12/1999 | Lee | G09G 1/04 315/371 |
| 6,076,169 | A * | 6/2000 | Lee | G06F 1/3215 713/320 |
| 6,205,318 | B1 * | 3/2001 | Schindler | H04N 5/4401 455/3.06 |
| 6,259,486 | B1 * | 7/2001 | Mahvi | H04N 5/44 348/553 |
| 7,411,631 | B1 * | 8/2008 | Joshi | H04N 5/63 348/730 |
| 7,730,507 | B2 * | 6/2010 | Sakai | H04N 21/4436 725/14 |
| 8,004,616 | B2 * | 8/2011 | Kitamura | H04N 21/482 348/730 |
| 8,266,666 | B2 * | 9/2012 | Friedman | H04N 21/42204 725/133 |
| 9,069,458 | B2 | 6/2015 | Brewer | |
| 9,621,434 | B2 | 4/2017 | Kwak | |
| 10,419,235 | B2 * | 9/2019 | Lin | G08B 21/0294 |
| 2005/0132420 | A1 * | 6/2005 | Howard | G10L 15/24 725/135 |
| 2005/0243081 | A1 * | 11/2005 | Cha | H02M 1/4225 345/212 |
| 2006/0140452 | A1 * | 6/2006 | Raynor | G06F 1/3231 382/115 |
| 2007/0152994 | A1 * | 7/2007 | Koh | H04N 5/63 345/211 |
| 2009/0010671 | A1 * | 1/2009 | Hashimoto | G03G 15/5004 399/88 |
| 2009/0021649 | A1 * | 1/2009 | Lee | H04N 5/63 348/730 |
| 2009/0133051 | A1 * | 5/2009 | Hildreth | H04N 21/4223 725/28 |
| 2009/0316796 | A1 * | 12/2009 | Taleb | H04N 21/4435 375/240.25 |
| 2009/0322723 | A1 | 12/2009 | Wu | |
| 2010/0196038 | A1 * | 8/2010 | Yamaguchi | G03G 15/2039 399/69 |
| 2010/0306558 | A1 * | 12/2010 | Kang | G06F 1/3203 713/300 |
| 2011/0179300 | A1 * | 7/2011 | Suzuki | G11B 17/056 713/323 |
| 2013/0106586 | A1 | 5/2013 | Vidal et al. | |
| 2013/0322846 | A1 * | 12/2013 | Ferren | G06F 3/0346 386/234 |
| 2014/0210754 | A1 * | 7/2014 | Ryu | G06F 3/0346 345/173 |
| 2014/0245041 | A1 * | 8/2014 | Ayalur | G06F 1/3212 713/323 |
| 2019/0387192 | A1 * | 12/2019 | Fang | H04N 21/43615 |

FOREIGN PATENT DOCUMENTS

| | | |
|---|---|---|
| WO | 2016085436 | 6/2016 |
| WO | 2018112715 | 6/2018 |

* cited by examiner

SYSTEMS, METHODS, AND MEDIA FOR PROVIDING AN ENHANCED REMOTE CONTROL THAT SYNCHRONIZES WITH MEDIA CONTENT PRESENTATION

TECHNICAL FIELD

The disclosed subject matter relates to systems, methods, and media for providing an enhanced remote control that synchronizes with media content presentation.

BACKGROUND

Users frequently watch different types of video content, such as television shows, movies, live-streamed content, videos, etc. In some cases, a user may want to watch video content at a particular time, for example, to not miss a particular television show or live-streamed broadcast. In other cases, a user may want to not watch video content at a particular time. For example, a user may want to turn off a television device to go to bed at a particular time. As another example, a parent may want to control an amount of video content watched by their child (e.g., no more than thirty minutes of screen time). It can, however, be difficult to control when such video content is watched. For example, it can be difficult to remember to turn on or turn off a television device at a particular time. In another example, even when parental controls have been set on a media application to limit screen time, a child may interact with a display device to continue to watch video content on the display device and outside of the media application.

Accordingly, it is desirable to provide systems, methods, and media for providing an enhanced remote control that synchronizes with media content presentation.

SUMMARY

In accordance with various embodiments of the disclosed subject matter, systems, methods, and media for providing an enhanced remote control that synchronizes with media content presentation are provided.

In accordance with some embodiments of the disclosed subject matter, a method for presenting and inhibiting media content is provided, the method comprising: receiving, using a hardware processor, a request to execute a media application for presenting media content on a media device, wherein the media application is associated with user preference settings that indicate a timing parameter for viewing media content and wherein the media device is controlled by a remote control device; causing, using the hardware processor, presentation of a media content item to begin; determining, using the hardware processor, whether the timing parameter for viewing media content from the user preference settings has been met; and, in response to determining that the timing parameter for viewing media content has been met, causing, using the hardware processor, the media application executing on the media device to end the presentation of the media content item and transmitting, using the hardware processor, a message to the remote control that disables the remote control from controlling the media device.

In some embodiments, the timing parameter includes a threshold amount of time for viewing the media content, and the media application ends the presentation of the media content item and the remote control is disabled from controlling the media device in response to determining that the threshold amount of time for viewing media content has elapsed.

In some embodiments, the method further comprises causing a user interface to be presented on the media device for setting the threshold amount of time for viewing media content, wherein one or more inputs provided on the remote control device set the threshold amount of time for viewing media content on the user interface.

In some embodiments, the timing parameter includes a time of day for viewing media content, and the media application ends the presentation of the media content item and the remote control is disabled from controlling the media device in response to determining that the time of day for viewing media content has elapsed.

In some embodiments, the timing parameter includes a calendar-based time for viewing the media content, and the media application ends the presentation of the media content item and the remote control is disabled from controlling the media device in response to determining that the calendar-based time for viewing media content has elapsed.

In some embodiments, the timing parameter corresponds with an end of the media content item, and the remote control is disabled from controlling the media device in response to determining that the media content item has ended.

In some embodiments, the method further comprises causing a user interface to be presented on the media device in response to determining that the timing parameter for viewing media content has been met, wherein the user interface indicates that the media application has been disabled on the media device and that the remote control device has been disabled from controlling the media device.

In some embodiments, the message transmitted to the remote control device causes the remote control device to not transmit one or more commands to the media device responsive to one or more button presses on the remote control device that are received subsequent to the message.

In some embodiments, the message transmitted to the remote control device causes one or more light sources on the remote control device to provide a light pattern indicating that the remote control device has been disabled from controlling the media device.

In some embodiments, the message transmitted to the remote control device causes the remote control device to transmit an instruction to the media device to be powered off.

In some embodiments, the method further comprises: receiving an identification code that allows the media application to continue presenting the media content item on the media device; and transmitting a second message to the remote control that activates the remote control for controlling the media device.

In some embodiments, a system for presenting and inhibiting media content is provided, the system comprising a server including a hardware processor, wherein the hardware processor: receives a request to execute a media application for presenting media content on a media device, wherein the media application is associated with user preference settings that indicate a threshold amount of time for viewing media content and wherein the media device is controlled by a remote control device; causes presentation of a media content item to begin; determines whether the timing parameter for viewing media content from the user preference settings has been met; and, in response to determining that the timing parameter for viewing media content has been met, causes the media application executing on the media device to end the presentation of the media content item and transmitting a message to the remote control that disables the remote control from controlling the media device.

In accordance with some embodiments of the disclosed subject matter, a non-transitory computer-readable medium containing computer executable instructions that, when executed by a processor, cause the processor to perform a method for presenting and inhibiting media content is provided, the method comprising: receiving a request to execute a media application for presenting media content on a media device, wherein the media application is associated with user preference settings that indicate a timing parameter for viewing media content and wherein the media device is controlled by a remote control device; causing presentation of a media content item to begin; determining whether the timing parameter for viewing media content from the user preference settings has been met; and, in response to determining that the timing parameter for viewing media content has been met, causing the media application executing on the media device to end the presentation of the media content item and transmitting a message to the remote control that disables the remote control from controlling the media device.

In accordance with some embodiments of the disclosed subject matter, a system for presenting and inhibiting media content is provided, the system comprising: means for receiving a request to execute a media application for presenting media content on a media device, wherein the media application is associated with user preference settings that indicate a timing parameter for viewing media content and wherein the media device is controlled by a remote control device; means for causing presentation of a media content item to begin; means for determining whether the timing parameter for viewing media content from the user preference settings has been met; and, in response to determining that the timing parameter for viewing media content has been met, means for causing the media application executing on the media device to end the presentation of the media content item and means for transmitting a message to the remote control that disables the remote control from controlling the media device.

In some embodiments, a remote control device is provided that comprises: a plurality of keys; a transmitter that transmits, over a first communication link, first signals to a media device; a receiver that receives, over a second communication link, signals from a server; and a hardware processor connected to the plurality of keys, the transmitter, and the receiver, wherein the hardware processor: transmits, via the transmitter to the media device via the first communication link, an instruction that controls a media application executing on the media device; concurrently with the media application being inhibited from being used on the media device, receives, via the receiver from the server via the second communication link, a message to disable the remote control device, wherein selections of one or more of the plurality of keys that are received subsequent to receiving the message are not transmitted to the media device via the first communication link; and disables use of the remote control.

In some embodiments, the first communication link is a Bluetooth link, and the second communication link is a Wi-Fi link.

In some embodiments, the first communication link is a first Wi-Fi link between the remote control device and the media device, and the second communication link is a second Wi-Fi link between the remote control device and the server.

In some embodiments, the hardware processor further: transmits, via the transmitter to the media device via the first communication link, a first instruction to power on the media device; receives an indication of a media content item to be presented on the media device; and transmits, via the transmitter to the media device via the first communication link, the indication of the media content item, wherein the media device begins presenting the media content item in response to receiving the indication.

In some embodiments, the message to disable the remote control further instructs that the media device is to be powered off and the hardware processor further transmits, via the transmitter to the media device via the first communication link, a second instruction to power off the media device.

In some embodiments, the message to disable the remote control and power off the media device is based on user preference settings that indicate a time of day at which the media device is to be powered off, and the message is received at the time of day.

In some embodiments, the user preference settings include first settings corresponding to a first user of the remote control device and second settings corresponding to a second user of the remote control device.

In some embodiments, the message to disable the remote control and power off the media device is based on user preference settings that indicate a threshold amount of time for viewing media content, and the message is received in response to determining that the threshold amount of time for viewing media content has elapsed.

In some embodiments, the message to disable the remote control and power off the media device corresponds to an end of a media content item, and the message is received in response to determining that the media content item has ended.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
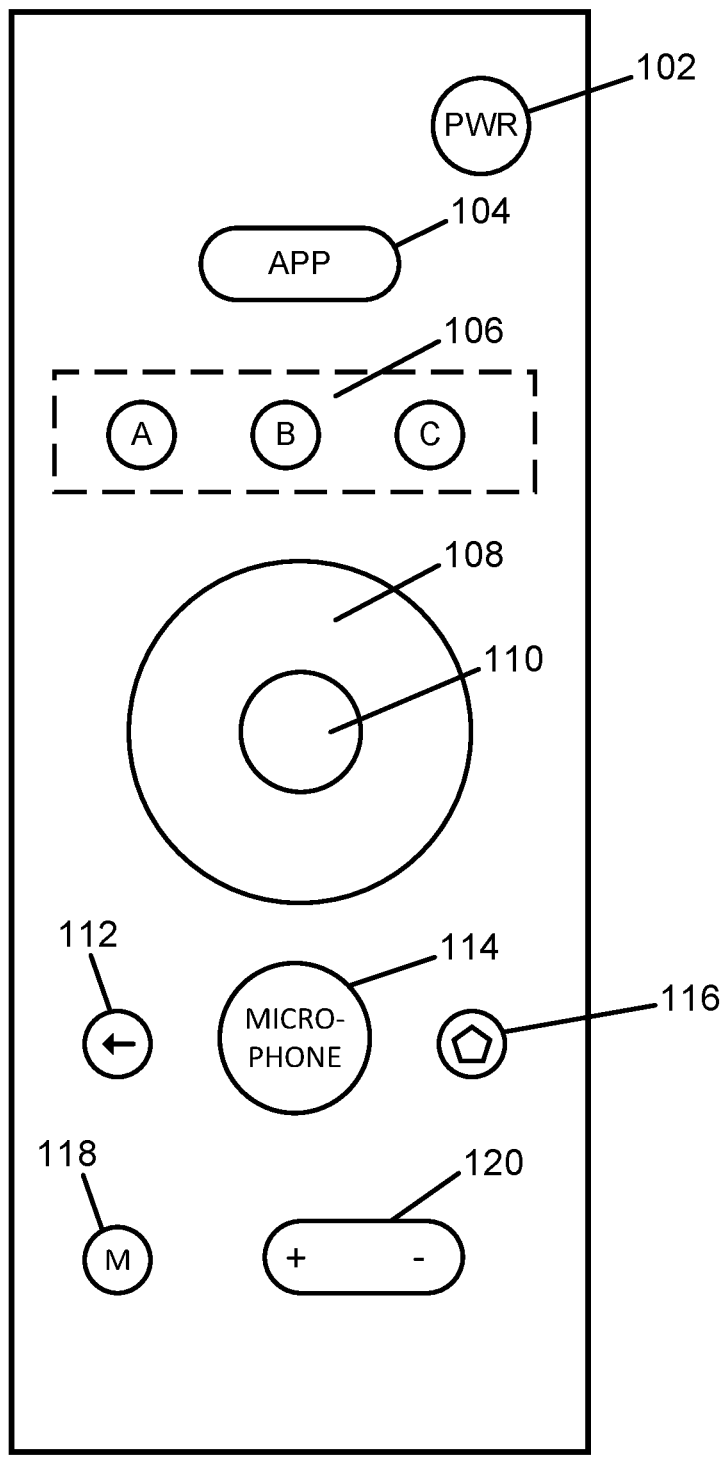
FIG. 1 shows an illustrative example of a top view of a remote control incorporating the mechanisms described herein in accordance with some embodiments of the disclosed subject matter.

In accordance with various embodiments, mechanisms for providing an enhanced remote control that synchronizes with media content presentation are provided.

In some embodiments, the mechanisms described herein can control presentation of media content on a media device (e.g., a television, a smart television, a streaming media device connected to a television, speakers, and/or any other suitable type of media device) using a remote control.

In some embodiments, the mechanisms can control presentation of media content using user preference settings that indicate times media content is to be presented on the media device, times media content is not to be presented on the media device, and/or any other suitable information. For example, in some embodiments, the user preference settings can indicate that a particular media content item (e.g., a television show, a movie, a live-streamed broadcast, newly uploaded content to a particular content source, and/or any other suitable media content item) is to be presented at a particular time of day and/or day of the week. As a more particular example, in some embodiments, the user preference settings can indicate that a particular television show is to be presented on the media device on a particular day of the week and/or time of day (e.g., 8 p.m. on Mondays, 7 a.m. on weekdays, and/or any other suitable day of the week and/or time of day). As another example, in some embodiments, the user preference settings can indicate that media content is not to be presented at particular times of day and/or days of the week (e.g., after 10 p.m. on weeknights, between 9 a.m. and 5 p.m. on weekdays, and/or any other suitable times of day and/or days of the week). Note that, in some embodiments, user preference settings can be stored on a server, such as shown in and described below in connection with FIGS. 2 and 3.

In some embodiments, the mechanisms can control presentation of media content using the user preference settings in any suitable manner. For example, in some embodiments, the remote control can receive a message from a server that stores the user preference settings that indicates an action that is to occur based on the user preference settings, such as that a particular media content item is to begin being presented, that the media device is to be powered off, and/or any other suitable action. Continuing with this example, in some embodiments, the remote control can then transmit corresponding instructions to the media device. As a more particular example, in an instance in which the action is to begin presenting a particular media content item, the remote control can transmit a first instruction to the media device to power on, and a second instruction to the media device to begin presenting the particular media content item. As another more particular example, in an instance in which the action is to power off the media device, the remote control device can transmit an instruction to the media device to power off.

In some embodiments, in addition to transmitting an instruction to a media device to power off, the remote control can be disabled, thereby preventing the remote control from being used again during a predetermined time period specified in user preference settings (e.g., between 10 p.m. and 6 a.m., and/or any other suitable predetermined time period). In some embodiments, while disabled, the remote control can inhibit transmission of commands to the media device when user inputs are received by the remote control, such as when buttons of the remote control are pressed. In some embodiments, user preference settings that disable a remote control can be overridden, for example, by entering a PIN code on a mobile device paired with the remote control, and/or in any other suitable manner.

These and other features for providing an enhanced remote control that synchronizes with media content presentation are described in connection with FIGS. 1-4.

Turning to FIG. 1, an illustrative example of a top view of a remote control 100 is shown in accordance with some embodiments of the disclosed subject matter. In some embodiments, remote control 100 can include various buttons, such as buttons 102-120. Note that, in some embodiments, any of buttons 102-120 can be omitted, and, in some such embodiments, functions described herein as relating to buttons 102-120 can be implemented using soft buttons dynamically generated on a display area (not shown) of remote control 100.

In some embodiments, remote control 100 can include a power button 102 for controlling a power state of a media device, such as television, a streaming media device, a soundbar, and/or any other suitable media device. For example, if power button 102 is depressed, remote control 100 can cause a signal to be transmitted to the media device to power on (e.g., from an off or sleep state). Additionally, in some embodiments, a selector (not shown) can be included that can be used to select a device from multiple devices to power on by pressing power button 102. Such a selector can be, for example, a sliding switch, buttons that each correspond to various media devices, etc. In some embodiments, remote control 100 can include an indicator that indicates to a user which media device is currently selected.

In some embodiments, remote control 100 can include an application button 104. In some embodiments, application button 104 can correspond to a particular application (e.g., an application associated with a particular media streaming service, and/or any other suitable application). In some such embodiments, selection of application button 104 can cause the corresponding application to be launched by a media device controlled by remote control 100. In some embodiments, selection of application button 104 at a time when a media device controlled by remote control 100 is powered off can cause the media device to be powered on prior to launching the application. Note that, although one application button is shown on remote control 100 in FIG. 1, in some embodiments, remote control 100 can include any suitable number (e.g., two, three, four, and/or any other suitable number) of application buttons, each corresponding to a different application.

In some embodiments, remote control 100 can include a group of shortcut buttons 106. In some embodiments, the shortcut buttons can be programmed to perform any suitable functions. For example, in some embodiments, a particular shortcut button can be programmed to launch a particular application on a media device controlled by remote control 100. As another example, in some embodiments, a particular shortcut button can be programmed to be associated with a particular user such that selection of the shortcut button can cause the user to be logged in to any suitable user accounts (e.g., associated with particular media streaming services) and/or for any suitable user preferences associated with the user to be activated. As a further example, in some embodiments, a particular shortcut button can be programmed to launch a specific piece of content to be presented on a media device controlled by remote control 100 (e.g., resume the last channel watched, resume the last show watched, launch a specific show that the user selects, etc.). In continuing this example, in response to receiving a selection of a programmed shortcut button on remote control 100, remote control 100 can instruct the media device to power on (e.g., via a Bluetooth or Wi-Fi signal to the media device), launch a particular media playback application on the media device, access a particular piece of media content associated with the programmed shortcut button, and resume playback of the particular piece of media content (e.g., where a server provides a timestamp for resuming playback of the particular piece of media content).

Note that, in some embodiments, a shortcut can be programmed for a particular shortcut button and/or for a particular sequence of shortcut buttons. Additionally, note that, in some embodiments, a shortcut can be programmed in any suitable manner. For example, in some embodiments, a shortcut can be programmed using remote control 100 and a user interface displayed on a display of a media device controlled by remote control 100. As another example, in some embodiments, a shortcut can be programmed using a mobile device (e.g., a mobile phone, a tablet computer, a desktop computer, a wearable computer, and/or any other suitable mobile device) paired with remote control 100.

In some embodiments, remote control 100 can also include a directional pad 108 which can be pressed to indicate directional inputs. For example, depressing directional pad 108 at a particular point can complete (or inhibit) one or more circuits, and the completion of the one or more circuits can be detected by a processor of remote control 100 (e.g., as shown in and described below in connection with FIG. 2). The processor can then determine which direction was indicated based on which circuit(s) is completed. For example, if a right side of directional pad 108 is depressed, this can complete a circuit that indicates to the processor that the right side of the directional pad is pressed. In some embodiments, an "OK" or "select" button 110 can be included, as shown in FIG. 1, to select an element currently highlighted on a display that is being navigated using remote control 100. Note that, although FIG. 1 shows button 110 as located in a center portion of directional pad 108, this is merely exemplary, and button 110 can be located at any suitable location on remote 100.

In some embodiments, remote control 100 can include any suitable light indicators which can indicate a device status of remote control 100. For example, remote control 100 can include light sources (e.g., light-emitting diodes (LEDs)) disposed around the periphery of directional pad 108. In some embodiments, the light sources can project a light format (e.g., light color, light pattern, etc.) corresponding to a device status (e.g., not-ready status, connection status, error status, active, disabled, etc.) of remote control 100. For example, in response to an application executing on a media device being controlled by remote control 100 indicating that a timer for presenting media content has expired, remote control 100 can also be disabled and the light sources can project a light format (e.g., a solid red light ring) that indicates remote control 100 is disabled and cannot be used to control the media device. In another example, in response to an application executing on a media device being controlled by remote control 100 indicating that a timer for presenting media content has been extended, remote control 100 can be activated and the light sources can project a light format (e.g., a flashing green light ring) that indicates remote control 100 is reactivated and can be used to control the media device.

Additionally or alternatively, in some embodiments, remote control 100 can include any suitable audio output components, such as a speaker. For example, in response to an application executing on a media device being controlled by remote control 100 indicating that a timer for presenting media content has expired, remote control 100 can also be disabled in which an alert of the disabled remote control is provided where the light sources can project a light format (e.g., a solid red light ring) and the speaker can provide an audio output signal (e.g., a beep, a sequence of beeps, etc.) that indicates remote control 100 is disabled and cannot be used to control the media device.

In some embodiments, remote control 100 can include a back button 112. In some embodiments, selection of back button 112 can cause a previously presented user interface to be presented on a display of a media device controlled by remote control 100. For example, in an instance in which a user of remote control 100 uses remote control 100 to navigate from a first user interface to a second user interface, selection of back button 112 can cause the display to present the first user interface.

In some embodiments, remote control 100 can include a microphone button 114 for initiating a microphone function on a media device controlled by remote control 100. After pressing microphone button 114, a user can be prompted to speak a voice command for causing the media device to perform some function. Any suitable techniques can be used to prompt a user for a voice command, such as, a sound, an image, etc. Alternatively, a user may not be prompted to speak a voice command, but pressing microphone button 114 can cause an instruction to the media device to prepare to receive a voice command (e.g., by activating a microphone on the media device). In some embodiments, the media device and/or remote control 100 can be configured to recognize any suitable voice commands. For example, commands that replicate actions caused by pressing buttons on remote 100 can be recognized. As another example, a user can initiate a search using a voice command. As yet another example, a user can tune to a particular channel by number and/or by name (e.g., channel 451, channel 2, "CBA," "Food Channel," etc.). As a further example, a user can launch an application on the media device using a voice command (e.g., "play <video> using <application>").

In some embodiments, a microphone for receiving voice commands can be included in remote control 100. If a microphone is included in remote control 100, a voice command can be interpreted by a processor of remote control 100 and/or can be sent to the media device controlled by remote control 100 for interpretation, to an intermediate device or streaming device associated with the system for interpretation (e.g., as shown in and described below in connection with FIG. 2), and/or to a server for interpretation (e.g., as shown in and described below in connection with FIG. 2). Additionally, in some embodiments, the microphone can be used for detecting a trigger sound (e.g., clapping, a spoken word, and/or any other suitable trigger sound). In some embodiments, in response to detecting the trigger sound, remote control 100 can be programmed to present an indication of a location of remote control 100, for example, by emitting a particular tone, beep, or other audible sound.

In some embodiments, remote control 100 can include a home button 116 for returning to a home screen of a media device controlled by remote control 100 and/or exiting from a current screen and returning to a main input. For example, if the media device that is being controlled using remote control 100 is a digital media receiver running an operating system that has a home screen, an instruction transmitted in response to pressing home button 116 can cause the digital media receiver to go to the home screen. As another example, if the media device that is being controlled using remote control 100 is a set-top box from a cable provider, an instruction transmitted in response to pressing home button 116 can cause the set-top box to exit any screen that is currently being displayed and return to a last channel that was tuned by the set-top box. In some embodiments, if the media device is currently running an application, pressing home button 116 can cause the media device to display a home screen of the application. Additionally, in such an implementation, pressing and holding home button 116 can cause the media device to go to a home screen of the media device.

In some embodiments, remote control 100 can include a mute button 118 for muting the sound output from a media device controlled by remote control 100.

In some embodiments, remote control 100 can include a volume button 120. Volume button 120 can be used to control a volume of a media device controlled by remote control 100 and/or one or more speakers associated with the media device. In some embodiments, volume button 120 can be located at any suitable location on remote control 100.

In some embodiments, remote control 100 can also include a motion sensor (not shown) for sensing rotational and/or linear motion of remote control 100, and/or orientation of remote control 100. For example, when the user moves remote control 100 containing the motion sensor (e.g., a gyroscope, an accelerometer, a magnetometer, etc.), the motion sensor can transmit motion and/or orientation information relating to remote control 100. As described herein, the motion sensor can be used to detect signals indicative of motion of remote control 100, detect signals indicative of the orientation of remote control (e.g., which portion of remote control 100 is facing up), detect signals indicative of particular gestures (e.g., shaking, swinging, etc.), etc.

In some embodiments, remote control 100 can include any other suitable selectable buttons not shown in FIG. 1. For example, in some embodiments, remote control 100 can include an input button for controlling a selected input of a media device. For example, if the media device is a television, it can have multiple inputs such as one or more High Definition Multimedia Interface (HDMI) inputs, one or more coaxial inputs, one or more component video inputs, one or more DisplayPort inputs, one or more fiber optic inputs, etc. Pressing the input button can cause remote control 100 to transmit an instruction to a media device to change a selected input. Selecting an input can be performed using any suitable technique. For example, in some embodiments, after pressing the input button, a list of selectable inputs can be displayed on a display connected to the media device and a user can select a desired input by either holding down and/or repeatedly pressing the input button, or by using directional pad 108 and selection button 110 to navigate to a particular input and select the particular input.

As another example, in some embodiments, remote control 100 can include a picture-in-picture (PiP) button. For example, if a user depresses the PiP button, remote control 100 can transmit an instruction to a media device to display content from a second source (e.g., a second channel) over content from a first source currently being displayed (e.g., a first channel). In such an example, the content from the second source can be displayed, for instance, in a corner of a display connected to the media device.

As yet another example, in some embodiments, remote control 100 can include a guide button that can initiate a program guide of available media content. For example, such a guide can be an electronic program guide that displays available programming to a user and can be organized based on time, channel, category, etc. As another example, such a guide can include a list of over-the-top content, such as television shows and/or movies, that are available to be retrieved and displayed by a media device controlled by remote control 100.

As still another example, in some embodiments, remote control 100 can include a menu button for calling up a menu on a media device controlled by remote control 100. For example, pressing the menu button can cause the media device to open a menu. As another example, if the media device is running an application, pressing the menu button can cause additional options and/or a menu related to the application to be presented to the user.

As still another example, in some embodiments, remote control 100 can include media buttons for controlling playback of media by a media device controlled by remote control 100. For example, the media buttons can include a play button, a pause button, a fast-forward button, a rewind button, a skip forward button, any other suitable media buttons, and/or any suitable combination thereof. In some embodiments, buttons that a user may use more commonly (e.g., play and pause buttons) can be centrally located and raised as compared to less commonly used buttons (e.g., rewind and fast forward). Additionally or alternatively, different media buttons can have different shapes to differentiate the buttons from one another. These features can facilitate a user in pressing a correct button while the user's gaze is not directed at remote control 100, but is instead directed at, for example, a display connected to the media device.

In some embodiments, certain buttons can have embossed lettering and/or symbols (e.g., "+" and "−" on volume button 120), and/or the buttons themselves can be raised so that they can be more easily identified by a user without looking at remote control 200.

Figure 2:
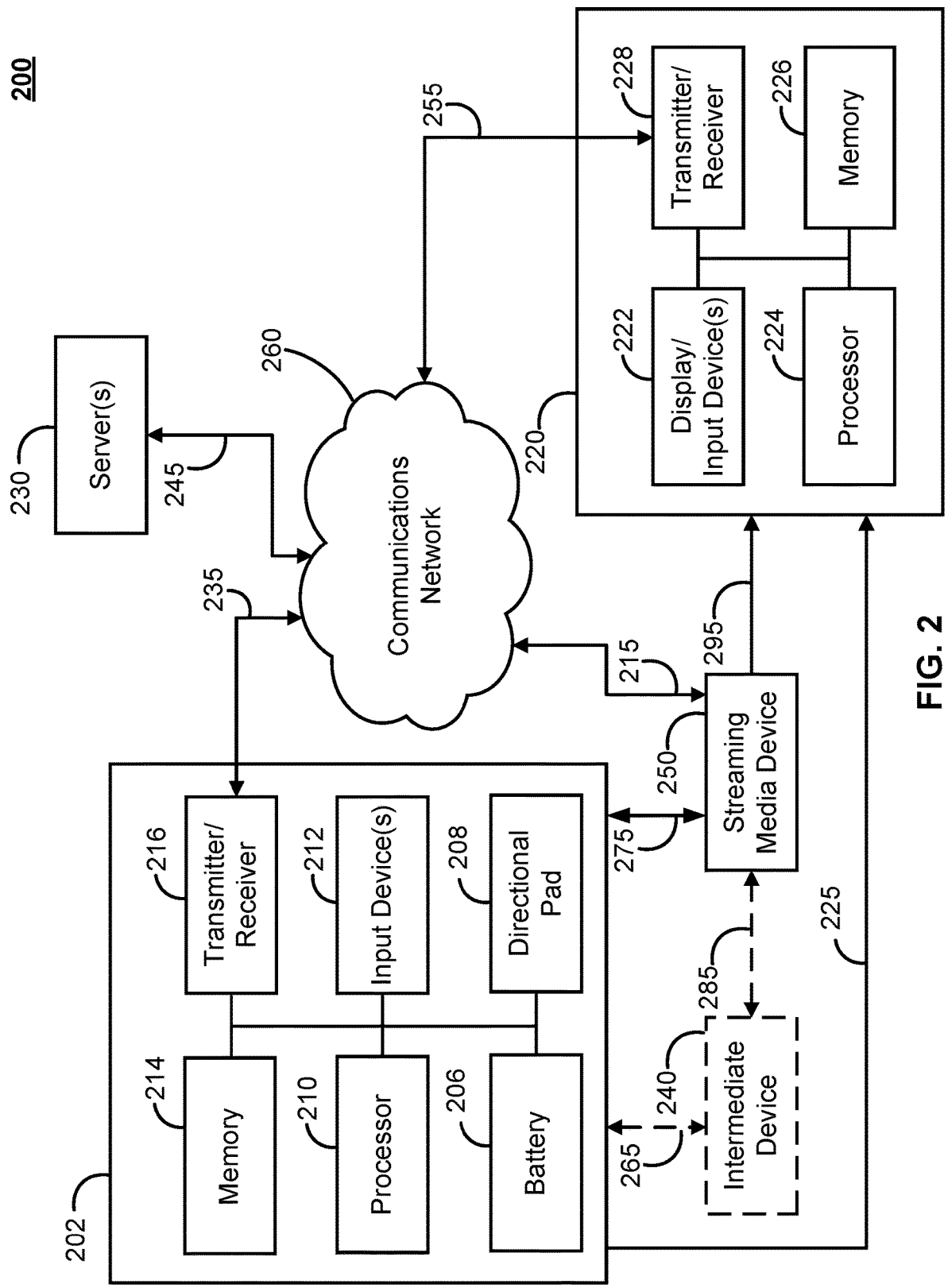
FIG. 2 shows an illustrative example of a schematic diagram of a system for providing an enhanced remote control that synchronizes with media content presentation in accordance with some embodiments of the disclosed subject matter.

Turning to FIG. 2, an illustrative example of a generalized schematic diagram of a system 200 that includes a media device, an enhanced remote control that controls the media device, and a server is shown in accordance with some embodiments of the disclosed subject matter.

As illustrated, system 200 can include an enhanced remote control 202 that can be used to control one or more media devices, such as a media device 220. In a more particular example, as shown in FIG. 2, enhanced remote control 202 can include a battery 206, a directional pad 208, a processor 210, one or more input devices 212, a memory 214, and a transmitter/receiver 216, which can be interconnected.

In some embodiments, battery 206 can be any suitable type of battery for powering remote control 202. For example, in some embodiments, battery 206 can be a rechargeable battery. In some such embodiments, battery 206 can be charged using power from an external source which can be connected to remote control 202 in any suitable manner (e.g., a micro USB port on remote control 202, and/or in any other suitable manner). Additionally or alternatively, battery 206 can be wirelessly charged, where a wireless power transceiver of a charging device can receive power from a power source and, in turn, the wireless power transceiver of the charging device can transmit power to battery 206 of a connected remote control 202 via a suitable converter circuit.

In some embodiments, remote control 202 can include directional pad 208. Directional pad 208 can include a number of switches that, when activated, indicate a directional input, as shown in and described above in connection with FIG. 1. For example, directional pad 208 can include a button that a user can press to indicate a direction. This button can activate one or more of the switches, and a signal from the one or more switches can be correlated by processor 210 with a direction indicated by pressing the button.

Directional pad 208 and processor 210 can be configured to accept any suitable number of inputs for various directions in accordance with some embodiments. For example, processor 210 can be configured to detect inputs in four directions (e.g., up, down, left and right) from directional pad 208. In another example, processor 210 can be configured to detect eight directional inputs (e.g., up, down, left, right and intermediate directions, such as, top-right diagonal, top-left diagonal, bottom-right diagonal, and bottom-left diagonal) from directional pad 208. In yet another example, processor 210 can be configured to detect inputs in any arbitrary direction from directional pad 208. In such an example, directional pad 208 can include touch sensors that can be used to detect an arbitrary position of an input to directional pad 208.

In some embodiments, processor 210 can use a computer program to cause signals to be transmitted from remote control 202. In some embodiments, these signals can be transmitted using transmitter/receiver 216, which can include one or more transmitters, receivers, antennas, transmitter/receivers, etc. Transmitter/receiver 216 can transmit and/or receive signals using any suitable technologies and/or frequencies. For example, transmitter/receiver 216 can transmit and/or receive Bluetooth signals (e.g., Bluetooth Low Energy (BLE) signals), Wi-Fi signals, radio signals, infrared signals, near-infrared signals, ultrasonic signals, etc. In a more particular example, transmitter/receiver 216 of remote control 202 can transmit and/or receive Wi-Fi signals over communications network 206 with transmitter/receiver 228 of media device 220. In another more particular example, transmitter/receiver 216 of remote control 202 can transmit and/or receive Bluetooth Low Energy (BLE) signals between transmitter/receiver 228 of media device 220 and/or any other suitable intermediate device or streaming media device. In yet another more particular example, transmitter/receiver 216 of remote control 202 can receive instructions from server 230 over communications network 260, which can include instructions to disable remote control 202 from controlling media device 220, instructions to reactivate remote control 202 such that it can control media device 220, instructions to generate particular output signals (e.g., light patterns, audio signals, etc.) to indicate a status of remote control 202, instructions to indicate that remote control 202 will be disabled in a particular amount of time (e.g., five minute warning, etc.).

In some embodiments, memory 214 can store a computer program for controlling processor 110. For example, the computer program can be stored in read-only memory (ROM), electrically programmable read only memory (EPROM), electrically erasable programmable read only memory (EEPROM), flash memory, etc.

In some embodiments, it should be noted that remote control 202 can include any other suitable input devices 212. Input devices 212 can include other suitable input features, such as an alphanumeric keypad, a power button, an input button, channel buttons, volume buttons, a volume mute button, directional buttons, media playback buttons (e.g., rewind, pause, play, and fast-forward buttons), a dedicated button that accesses downloadable applications for use by the media device, a microphone or other suitable audio input, a camera, etc. For example, in some embodiments, remote control 202 can include a microphone that can be used for any suitable purposes. As a more particular example, in some embodiments, the microphone can be used to receive voice queries (e.g., to begin playing a particular media content item, to execute a search query, and/or any other suitable voice query), which can be processed either by remote control 202 or transmitted from remote control 202 to another device for processing (e.g., to media device 220, to server 230, and/or to any other suitable device). As another more particular example, in some embodiments, the microphone can be used to detect any suitable audible sound (e.g., clapping, a spoken word or phrase, etc.) that can be used as a trigger to present an indication of a location of remote control 202 (e.g., by causing the remote control to emit an audible tone or beep). In some embodiments, input devices 212 can include hardware buttons and/or software buttons (e.g., programmable buttons). In some embodiments, input devices 212 can also include other inputs, such as, a computer keyboard, a cursor-controller, a dial, a switchbank, a lever, a touchscreen, and/or any other suitable input device.

In some embodiments, it should be noted that remote control 202 can include any suitable indicators for indicating the device status of remote control 202. For example, remote control 202 can include any suitable number of light sources (e.g., light-emitting diodes (LEDs)) disposed around the periphery of directional pad 108 that indicate the device status of remote control 202. In a more particular example, the light sources can project a light format (e.g., light color, light pattern, etc.) corresponding to a device status (e.g., not-ready status, connection status, error status, active, disabled, etc.) of remote control 202. In response to an application executing on media device 220 being controlled by remote control 202 indicating that a timer for presenting media content has expired, remote control 202 can also be disabled and the light sources can project a light format (e.g., a solid red light ring) that indicates remote control 202 is disabled and cannot be used to control the media device. In response to an application executing on media device 220 being controlled by remote control 202 indicating that a timer for presenting media content has been extended, remote control 202 can be activated from an inactive or disabled state and the light sources can project a light format (e.g., a flashing green light ring) that indicates remote control 202 is reactivated and can be used to control media device 220. Additionally or alternatively, in some embodiments, remote control 202 can include any suitable audio output components, such as a speaker. For example, in response to an application executing on media device 220 being controlled by remote control 202 indicating that a timer for presenting media content has expired, remote control 202 can also be disabled in which an alert of the disabled remote control is provided where the light sources can project a light format (e.g., a solid red light ring) and the speaker can provide an audio output signal (e.g., a beep, a sequence of beeps, etc.) that indicates remote control 202 is disabled and cannot be used to control the media device. In another example, a speaker on remote control 202 and a speaker on media device 220 can each provide an audio output signal indicating that remote control 202 and the media application executing on media device 220 are disabled from being used to control or playback media content.

System 200 can include one or more media devices 220, such as a media device for viewing media content listings and/or obtaining and presenting content items from various sources (e.g., broadcast content, on-demand content, locally stored content, Internet content, streamed content, live-streamed content, etc.). For example, media device 220 can be implemented as a television, a smart television, a set-top box, a streaming media device, a digital media receiver, a computer, a gaming console, an optical media player, etc. Remote control 202 and media device 220 can be local to each other or remote from each other. For example, enhanced remote control 202 and media device 220 can be located in the same room.

More particularly, in some embodiments, media device 220 can include a display/input device 222, a processor 224, memory 226, and one or more transmitters, receivers, and/or transmitter/receivers 228, which can be interconnected.

In some embodiments, media device 220 can include a storage device, such as a hard drive, a digital video recorder, a solid-state storage device, a removable storage device, or any other suitable device for storing guidance information and/or remote control instructions. In a more particular example, the storage device can store a computer program for controlling processor 224 in media device 220 (e.g., responsive to instructions received from remote control 202).

Processor 224 can use the computer program to present content on display/input device 222 and control an interface that allows a user to interact with the content and to send and receive data using transmitter/receiver 228. In some embodiments, transmitter/receiver 228 can transmit and/or receive Bluetooth signals (e.g., Bluetooth Low Energy (BLE) signals), Wi-Fi signals, radio signals, infrared signals, near-infrared signals, ultrasonic signals, etc. For example, transmitter/receiver 228 of media device 220 can transmit and/or receive Wi-Fi signals over communications network 206 with transmitter/receiver 216 of remote control 202. In another example, transmitter/receiver 228 of media device 220 can transmit and/or receive Bluetooth Low Energy (BLE) signals between transmitter/receiver 216 of remote control 202 and/or any other suitable intermediate device or streaming media device.

Display/input device 222 can include input devices such as a computer keyboard, a cursor-controller, one or more buttons, a dial, a switchbank, a lever, a touchscreen, and/or any other suitable input device.

In some embodiments, instructions issued by remote control 202 can be formatted based on a model and/or brand of a media device 220 that is being controlled. For example, remote control 202 can be programmed with different codes and can act as a universal remote control for controlling different types of media devices. In some embodiments, formatting can be performed by a converter (not shown) that converts signals transmitted by remote control 202 into signals used by a particular media device 220.

In a more particular example, remote control 202 and media device 220 can be any of a general purpose device such as a computer or a special purpose device such as a remote control, a smartphone, a tablet computer, a set-top box, a smart TV, a game console, a digital media receiver, a server, etc., or any suitable combination of such devices. Any of these general or special purpose devices can include any suitable components such as a hardware processor (which can be a microprocessor, digital signal processor, a controller, etc.), memory, communication interfaces, display controllers, input devices, etc. For example, media device 220 can be implemented as a set-top box, a digital media receiver, a smart TV, a television, a laptop computer, a personal computer, a server, a smartphone, a tablet computer, a game console, etc.

In some embodiments, server 230 can be any suitable server that provides media content (e.g., television shows, video content, movies, live-streamed video content, audio content, video game content, and/or any other suitable media content), receives and maintains user preference settings, and/or perform any other suitable function(s). For example, as shown in and described below in connection with FIG. 3, in some embodiments, server 230 can receive and store user preferences that indicate times remote control 202 and/or media device 220 are to be activated and/or deactivated.

In some embodiments, remote control 202, media device 220, and server 230 can communicate in any suitable manner. For example, in some embodiments, remote control 202 can transmit commands (e.g., commands to navigate within a user interface, volume commands, power commands, and/or any other suitable commands) to media device 220 using any suitable direct communication link 225 (e.g., an infrared communication link, a radio communication link, and/or any other suitable type of communication link).

As another example, in some embodiments, server(s) 230 can receive and transmit information to remote control 202, media device 220, and/or a streaming media device 250 (described below in more detail) via a communication network 260. In some embodiments, communication network 260 can be any suitable type of communication network, such as a Wi-Fi network, a Local Area Network (LAN), and/or any other suitable type of network. In some embodiments, signals can be transmitted between remote control 202, media device 220, server(s) 230, and/or streaming media device 250 via communication network 260 using communication links 215, 235, 245, and/or 255, as shown in FIG. 2. In some embodiments, communication links 215, 235, 245, and/or 255 can be any suitable type(s) of wired or wireless communication links.

In some embodiments, communication between remote control device 202 and media device 220 can be via streaming media device 250 that is paired with media device 220 via a communication link 295. For example, in some embodiments, streaming media device 250 can be connected to media device 220 via an HDMI connection. In some embodiments, streaming media device 250 can launch any suitable applications used for presenting content on media device 220, for example, by launching an application and navigating to a particular deeplink associated with requested content.

In some embodiments, remote control device 202 can communicate with streaming media device 250 in any suitable manner. For example, in some embodiments, remote control device 202 can communicate with streaming media device 250 via a communication link 275. In some such embodiments, communication link 275 can be a Wi-Fi link, a BLUETOOTH link, and/or any other suitable type of communication link. In a more particular example, remote control device 202 can transmit an instruction to streaming media device 250 via a Wi-Fi signal or via a Bluetooth signal, where streaming media device 250 can transmit a corresponding instruction to media device 220 connected to streaming media device 250 (e.g., via a HDMI-CEC channel). In another more particular example, remote control 202 can receive current state information from streaming media device 250 over communication link 275 (e.g., state information that indicates a user is currently watching a particular media content item using a media playback application, state information that indicates a cumulative watchtime of users using the media playback application, state information that indicates the last program viewed by the user on streaming media device 250, state information that indicates the media application being launched on streaming media device 250, etc.). Note that, in some embodiments, remote control device 202 and streaming media device 250 can be paired in any suitable manner, such as via a discovery protocol (Discovery and Launch (DIAL), and/or any other suitable discovery protocol) associated with a local network. Additionally, note that, in instances in which communication link 275 is a Wi-Fi link, remote control 202 can be Wi-Fi capable.

In a more particular example, as remote control device 202 can communicate with streaming media device 250 over communication link 275, remote control 202 can aggregate state information from streaming media device 250 over time (e.g., for a particular day). For example, in response to receiving state information at particular times, remote control device 202 can calculate a cumulative watchtime for a user account and for a particular day. In continuing this example, in response to remote control device 202 having a user preference indicating a maximum watchtime of one hour, remote control device 202 can automatically be disabled in response to determining that the cumulative watchtime for the user account and for the particular day has reached the maximum watchtime of one hour. In some embodiments, remote control device 202 can transmit an instruction to streaming media device 250 that the cumulative watchtime for the user account and for the particular day has reached the maximum watchtime of one hour such that the media playback application executing on the media device can inhibit the presentation of further media content.

As another example, in some embodiments, remote control device 202 can communicate with streaming media device 250 via an intermediate device 240. In some embodiments, intermediate device 240 can be a Wi-Fi dongle that allows intermediate device 240 to communicate via a Wi-Fi communication link 285 with streaming media device 250. In some embodiments, remote control device 202 can communicate with intermediate device 240 via a communication link 265. In some embodiments, communication link 265 can be a BLUETOOTH link, and/or any other suitable type of communication link. Note that, in some embodiments, intermediate device 240 can be omitted.

Figure 3:
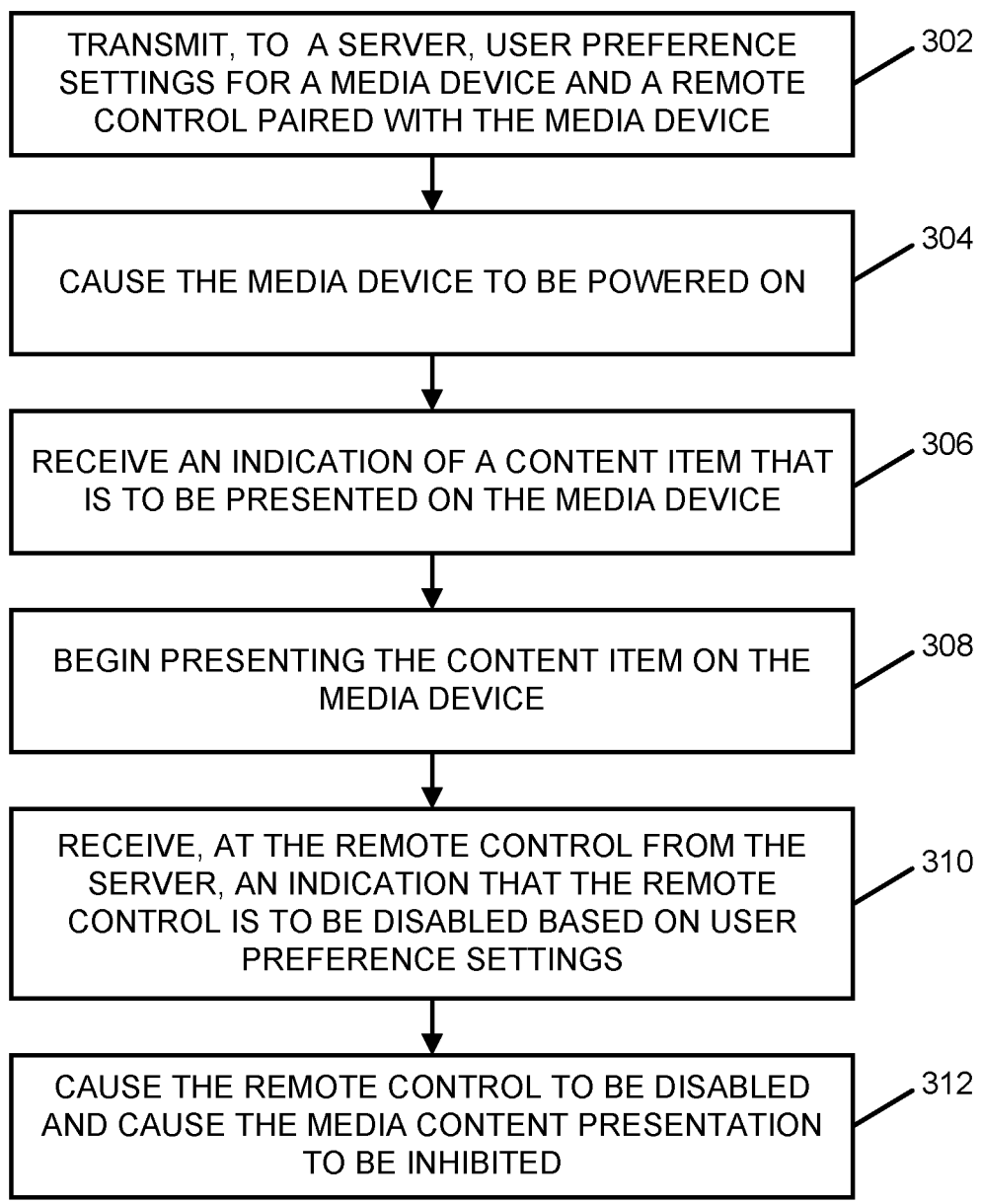
FIG. 3 shows an illustrative example of a process for providing an enhanced remote control that synchronizes with media content presentation in accordance with some embodiments of the disclosed subject matter.

Turning to FIG. 3, an illustrative example 300 of a process for providing an enhanced remote control that synchronizes with media content presentation are shown in accordance with some embodiments of the disclosed subject matter. In some embodiments, blocks of process 300 can be executed by any suitable device, such as a remote control that is controlling a media device (e.g., a television, a streaming media device paired with a television, a speaker, and/or any other suitable type of media device).

Process 300 can begin at 302 by transmitting, to a server, user preference settings for a media device and a remote control device paired with the media device. In some embodiments, the user preference settings can indicate any suitable information. For example, in some embodiments, the user preference settings can indicate particular times a user of the media device would like to use the media device, and therefore, particular times the media device is to be automatically activated without user input. As a more particular example, in some embodiments, the user preference settings can indicate that a user of the media device wants to watch a particular media content item at a particular time of day and/or day of the week (e.g., Mondays at 8 p.m., Fridays at 9 p.m., and/or any other suitable particular time). Continuing with this particular example, in some embodiments, the user preference settings can indicate a content source for the media content item, such as a particular broadcast channel, a particular media content streaming service, a particular playlist (e.g., that has been curated by the user, that has been saved by the user, and/or any other suitable playlist), and/or any other suitable content source. As a specific example, the user preference settings can indicate that the media device is to begin presenting a particular broadcast channel at a particular day and time. As another specific example, the user preference settings can indicate that the media device is to begin presenting a particular playlist (e.g., a particular audio content playlist, a particular video content playlist, and/or any other suitable playlist) at a particular day and time. As yet another specific example, the user preference settings can indicate that the media device is to launch a particular media content streaming service and begin playing a next episode of a particular television series at a particular day and time.

Note that, in some embodiments, in addition to or instead of indicating a particular day and time, the user preference settings can indicate that a particular content item is to begin being presented in response to detection of any suitable event, such as a user who specified the user preference settings being within a predetermined proximity of the media device (e.g., based on a detection that a mobile device of the user has entered a predetermined proximity range, etc.) For example, in some embodiments, the user preference settings can indicate that a particular content item is to begin being presented within a particular time range (e.g., between 7 a.m. and 8 a.m., between 5 p.m. and 5:30 p.m., and/or any other suitable time range) in response to detecting that a mobile device of the user is detected in proximity of the media device within the time range. As a more particular example, the user preference settings can specify that a workout music playlist is to begin being presented when the user enters a room of the media device within a particular time range. As another more particular example, the user preference settings can specify that a morning news channel is to begin being presented on weekday mornings when the user enters a room of the media device within a particular time range.

As another example, in some embodiments, the user preference settings can indicate that, in response to determining that a particular content source has new content that has not yet been viewed by the user, the media device is to begin presenting the new content. As a more particular example, in some embodiments, the content source can be a particular content channel of a media content sharing source. Continuing with this particular example, in some embodiments, the user preference settings can indicate that the media device is to begin presenting new content that has been uploaded to the indicated content source. Note that, in some embodiments, the user preference settings can indicate that a notification or alert of new content to a particular content source is to be provided rather than automatically presenting the new content on the media device. For example, in some embodiments, the user preference settings can indicate a type of alert or notification that is to be presented in response to determining that the content source has new content. As a more particular example, the type of alert or notification can include a message presented on the media device, a message presented on a mobile device paired with the media device, an alert delivered via the remote control (e.g., activation of one or more lights of the remote control, a vibration or other haptic feedback delivered via the remote control, a tone emitted by a speaker of the remote control, and/or any other suitable type of alert).

As yet another example, in some embodiments, the user preference settings can indicate particular times the media device and/or the remote control are to be disabled. As a more particular example, in some embodiments, the user preference settings can indicate a time in the evening or at night (e.g., 9 p.m., 10 p.m., and/or any other suitable time) at which the media device and/or the remote control are to be disabled. As another more particular example, in some embodiments, the user preference settings can indicate that the media device and/or the remote control are to be powered off after the media device has been used for more than a predetermined duration of time (e.g., more than two hours, more than three hours, after a particular maximum watchtime has been met, and/or any other suitable duration of time) in a consecutive block and/or over the course of a day. As yet another more particular example, in some embodiments, the user preference settings can indicate a sleep timer in which the media device and/or the remote control are to be powered off and/or otherwise disabled after N minutes in the sleep timer have elapsed. As a further example, in some embodiments, the user preference settings can indicate that the media device and/or the remote control are to be powered off and/or otherwise disabled after a program has ended.

Note that, in some embodiments, different criteria can be used for different days of the week. For example, in some embodiments, the user preference settings can indicate a first time at which the media device and/or the remote control are to be disabled on weeknights and a second time at which the media device and/or the remote control are to be disabled on weekends.

Note that, in some embodiments, user preference settings can be specified individually for different users of the media device, such as different members of a household. For example, in some embodiments, user preference settings for a first user can indicate that the media device is to automatically be powered on and present a particular content item at a particular day and/or time, and is to be automatically deactivated for use by the first user at a particular time of day. Continuing with this example, in some embodiments, user preference settings for a second user can indicate that the media device is to be automatically powered on and present a different content item at a different day and/or time, and is to be automatically deactivated for use by the second user at a different time of day. In some embodiments, in instances in which a particular user is a child, user preference settings can be specified by a parent of the child.

Note that, in some embodiments, user preference settings for different users can each be associated with a different user account. In some embodiments, the user account can be used to implement the user preference settings with respect to activating and deactivating the media device and/or the remote control. Additionally, in some embodiments, the user account can be used to recommend personalized content for the user based on interests the user has indicated, previously viewed content, and/or based on any other suitable factors. Note that, in instances in which the user is a child, recommended content can be screened for age-appropriateness in any suitable manner and using any suitable technique(s).

In some embodiments, user preference settings can be associated with triggers from other applications that communicate with the remote control device or the media device. For example, in response to an educational application determining that a child user has completed a daily assignment, the educational application can transmit a message to the remote control device that activates the remote control device to control the media device. In continuing this example, in response to receiving the message and based on time of day, the remote control device can automatically set a particular watchtime for the child user (e.g., sixty minutes). In another example, in response to receiving state information from the media device that a child user has launched a media application on the media device and has begun watching a media content item, the remote control device can transmit a request to the educational application to determine whether the child user has completed a daily assignment and, in response to receiving a response to the request indicating that the child user has not completed the daily assignment, the remote control device can set a particular watchtime for the child user (e.g., zero minutes, five minutes, thirty minutes, etc.).

At 304, process 300 can cause the media device to be powered on. In some embodiments, an instruction to power on the media device can be transmitted by the remote control to the media device in any suitable manner, for example, via an infrared (IR) signal that includes a command code to turn on. Additionally or alternatively, an instruction to power on the media device can be transmitted by the remote control to the media device via a wireless signal (e.g., a Wi-Fi signal, a Bluetooth Low Energy (BLE) signal, etc.) to a streaming media device (e.g., streaming media device 250 of FIG. 2) that is connected to an HDMI port of the media device (e.g., media device 220 of FIG. 2).

In some embodiments, the instruction to power on can be generated in response to any suitable event. For example, in some embodiments, the instruction to power on can be generated in response to detection that a power button on the remote control has been pressed. As another example, in some embodiments, the instruction to power on can be generated in response to detection that an application button on the remote control to launch a particular application has been pressed. As yet another example, in some embodiments, the instruction to power on can be generated in response to receiving a message from the server that the media device is to be powered on based on stored user preference settings. As a more particular example, in some embodiments, the message can indicate that a particular television show is to be presented at a particular time based on the user preference settings. Note that, in some embodiments, any additional devices paired with the media device, such as a soundbar, can additionally be instructed to power on.

At 306, process 300 can receive an indication of a content item that is to be presented on the media device. In some embodiments, process 300 can receive the instruction based on user inputs received via the remote control. For example, in some embodiments, the remote control can be used to navigate through a display of available media content items (e.g., available broadcast channels, available media content in a particular media content sharing service, and/or any other suitable media content items) and to select the content item that is to be presented. Alternatively, in some embodiments, the content item can be indicated in a message transmitted from the server to the remote control based on the user preference settings. For example, in an instance in which the user preference settings indicate that a particular content item is to be presented at a particular day and/or time, the message transmitted from the server to the remote control as described above in connection with 304 can indicate an identifier of the content item. Continuing with this example, in some embodiments, the remote control can transmit an identifier of the content item to the media device in any suitable manner (e.g., as a link within an application, and/or in any other suitable manner). As a more particular example, in some embodiments, the remote control can transmit the identifier of the content item to the media device as a deeplink within an application (e.g., an application for presenting content provided by a particular media content sharing source) that causes the application to be launched by the media device.

At 308, process 300 can begin presenting the content item on the media device. In some embodiments, the media device can present the content item in any suitable manner. For example, in some embodiments, video content of the content item can be presented on a display of the media device. As another example, in some embodiments, audio content of the content item can be presented using speakers of the media device, a soundbar paired with or connected to the media device, and/or any other suitable type of speakers.

At 310, process 300 can receive, at the remote control from the server, an indication that the remote control is to be disabled based on user preference settings. For example, as discussed above in connection with 302, the user preference settings can indicate that the media device is to be powered off and the remote control is to be disabled after a particular time (e.g., after 9 p.m., after 10 p.m., and/or any other suitable time) and/or after the media device has been used for more than a predetermined duration of time. Continuing with this example, in some embodiments, the remote control can receive a message from the server that indicates that the media device is to be powered off and that the remote control is to be disabled. Note that, in some embodiments, the message can indicate that the media device is to be powered off and that the remote control is to be disabled at a current time. Alternatively, in some embodiments, the message can indicate that the media device is to be powered off and that the remote control is to be disabled at a particular time in the future.

Note that, in some embodiments, the server can transmit, to the remote control, information indicating user preference settings at any suitable time, and the remote control can store the user preference settings in memory of the remote control. In some such embodiments, at 310, the remote control can determine, based on previously stored user preference settings, that the media device is to be powered off and the remote control is to be disabled.

At 312, process 300 can cause the remote control to be disabled and can cause the media device to inhibit media content from being presented. In some embodiments, process 300 can cause the media device to inhibit media content from being presented in any suitable manner. For example, in some embodiments, the remote control can transmit an instruction to the media device to power off (e.g., via a communication link between the remote control and the media device, as shown in and described above in connection with FIG. 2). In another example, in some embodiments, the server can transmit an instruction to the media device that disables a media application executing on the media device from allowing a user to navigate and/or select a media content item using the media application.

Figure 4:
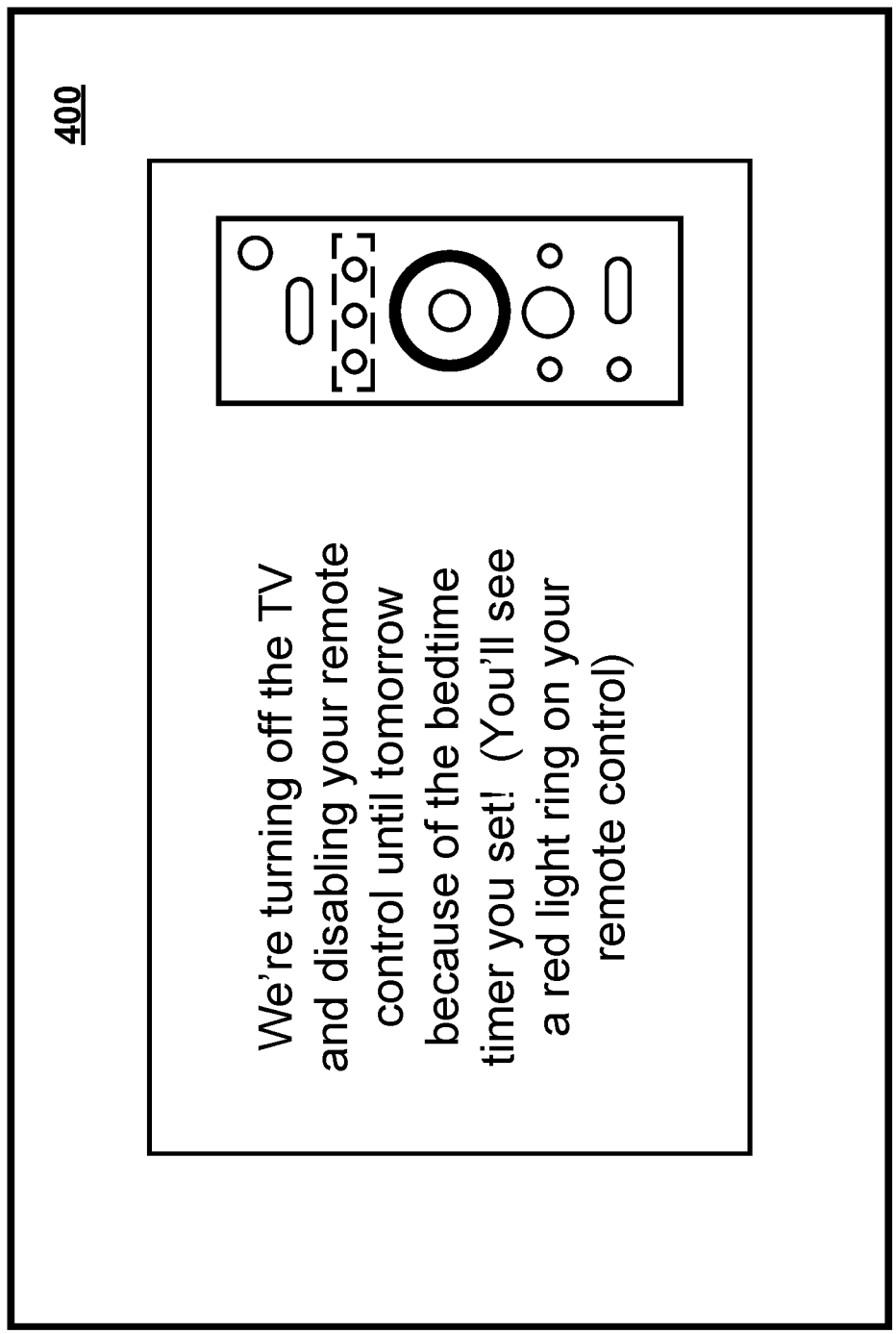
FIG. 4 shows an illustrative example of a user interface for indicating that a media device is being powered off and a remote control is being disabled in accordance with some embodiments of the disclosed subject matter.

Note that, in some embodiments, process 300 can cause an alert to be presented on the media device prior to inhibiting media content from being presented on the media device and/or causing the media device to be powered off. For example, in some embodiments, the alert can include a message that indicates that the media device is being powered off and the remote control is being disabled. Turning to FIG. 4, an illustrative example 400 of a user interface that can be presented on the media device prior to powering off the media device and disabling the remote control is shown in accordance with some embodiments of the disclosed subject matter. As also shown in FIG. 4, the user interface can include an image of the remote control along with an indication of the light pattern emitted from the remote control to indicate that the remote control is disabled from controlling the media device.

Note that, in instances in which the user currently using the media device is a child (e.g., in an instance in which the user is watching media content via a user account corresponding to a child), a presented alert can include any suitable child-friendly content, such as any suitable icons or animations, child-friendly characters, and/or any other suitable child-friendly content.

In a more particular example, parental controls in user preference settings for a media application can allow a parent or any other suitable user to set a timer for a maximum amount of time for playing back one or more media content items. In continuing this example, a user interface of the media application be presented on the media device in which the user can manipulate a slider interface to indicate the amount of time for the timer (e.g., ten minutes, thirty minutes, one hour, etc.). In response to the timer expiring, the media application can present a user interface, such as the user interface shown in FIG. 4, indicating that the timer has expired and that the viewer is inhibited from continuing to use the media application to playback media content, navigate through other media content items, and/or select other media content items for playback. In addition, in response to the timer expiring, the server can synchronize the disabling of the media application by also transmitting an instruction that disables the remote control. As such, a viewer cannot, for example, attempt to override the expired timer by operating the remote control to operate the media device, to restart the media application, to navigate for other media content items, etc.

Referring back to FIG. 3, in some embodiments, process 300 can cause the remote control to be disabled in any suitable manner. For example, in some embodiments, the remote control can inhibit transmission of commands corresponding to pressed buttons of the remote control. In another example, in some embodiments, the remote control can inhibit transmission of commands corresponding to pressed buttons of the remote control for a particular period of time while presenting indications that the remote control is currently disabled (e.g., light sources projecting a particular light format, speakers outputting a particular audio output signal, a vibratory signal for an initial period of time, any other suitable indication, and any suitable combination thereof).

Note that, in some embodiments, deactivation of the remote control can be performed in response to receiving an instruction from a mobile application executing on a mobile device. For example, in response to executing a corresponding media playback application executing on a mobile device in which a user of the mobile device selects an option to disable the remote control or otherwise inhibit media playback on the media device, the media playback application executing on the mobile device can transmit an instruction to disable the remote control. In a more particular example, the media playback application can transmit the instruction to disable the remote control to the server, which, in turn, can transmit a Wi-Fi signal to the remote control that causes the remote control to be disabled for a particular period of time (e.g., until the next calendar day, for the next hour, until 6 PM, until receiving a reactivation signal from the server, etc.).

Note also that, in some embodiments, deactivation of the remote control can be overridden in any suitable manner. For example, in some embodiments, the remote control can be reactivated in response to determining that a user has entered a particular code or PIN. In some such embodiments, the code or PIN can be entered on any suitable device, such as a mobile device paired with the remote control. In another example, the remote control can be reactivated from a disabled state in response to detecting that a particular pattern of keys has been selected on the remote control.

In some embodiments, the user interface can indicate that the remote control is disabled until a particular time. For example, as also shown in FIG. 4, the user interface can indicate that the remote control is disabled from being used to control the media device until tomorrow. In continuing this example, in response to the server determining that a particular trigger has been met (e.g., progressing to the next calendar day, progressing to the next calendar day in which the cumulative daily watchtime counter has been reset, etc.), the remote control can be reactivated. For example, upon determining that a particular trigger has been met, the server can transmit an instruction to the remote control that causes the remote control to be reactivated for controlling the media device. In turn, the remote control can present one or more indications that the remote control has been reactivated (e.g., light sources projecting a particular light format, speakers outputting a particular audio output signal, a vibratory signal for an initial period of time, any other suitable indication, and any suitable combination thereof).

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, systems, methods, and media for providing an enhanced remote control that synchronizes with media content presentation are provided.

In some embodiments, any suitable computer readable media can be used for storing instructions for performing the processes described herein. For example, in some embodiments, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), non-transitory forms of electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes described in connection with FIG. 3 can be executed or performed in any order or sequence not limited to the order and sequence shown and described in the figure. Also, some of the above steps of the process of FIG. 3 can be executed or performed substantially simultaneously where appropriate or in parallel to reduce latency and processing times.

It should also be noted that, as used herein, the term mechanism can encompass hardware, software, firmware, or any suitable combination thereof.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. A method for presenting and inhibiting media content, the method comprising:
   receiving, using a hardware processor, a request to execute a media application for presenting media content on a media device, wherein the media application is associated with user preference settings that indicate a timing parameter for viewing media content and wherein the media device is controlled by a remote control device;
   causing, using the hardware processor, presentation of a media content item to begin;
   determining, using the hardware processor, whether the timing parameter for viewing media content from the user preference settings has been met; and
   in response to determining that the timing parameter for viewing media content has been met, causing, using the hardware processor, the media application executing on the media device to end the presentation of the media content item and transmitting, using the hardware processor, a message to the remote control that disables the remote control from controlling the media device, wherein the message causes the remote control device to indicate a status that the remote control device has been disabled from controlling the media device.

2. The method of claim 1, wherein the timing parameter includes a threshold amount of time for viewing the media content and wherein the media application ends the presentation of the media content item and the remote control is disabled from controlling the media device in response to determining that the threshold amount of time for viewing media content has elapsed.

3. The method of claim 2, further comprising causing a user interface to be presented on the media device for setting the threshold amount of time for viewing media content, wherein one or more inputs provided on the remote control device set the threshold amount of time for viewing media content on the user interface.

4. The method of claim 1, wherein the timing parameter includes a time of day for viewing media content and wherein the media application ends the presentation of the media content item and the remote control is disabled from controlling the media device in response to determining that the time of day for viewing media content has elapsed.

5. The method of claim 1, wherein the timing parameter includes a calendar-based time for viewing the media content and wherein the media application ends the presentation of the media content item and the remote control is disabled from controlling the media device in response to determining that the calendar-based time for viewing media content has elapsed.

6. The method of claim 1, wherein the timing parameter corresponds with an end of the media content item and wherein the remote control is disabled from controlling the media device in response to determining that the media content item has ended.

7. The method of claim 1, further comprising causing a user interface to be presented on the media device in response to determining that the timing parameter for viewing media content has been met, wherein the user interface indicates that the media application has been disabled on the media device and that the remote control device has been disabled from controlling the media device.

8. The method of claim 1, wherein the message transmitted to the remote control device further causes the remote control device to not transmit one or more commands to the media device responsive to one or more button presses on the remote control device that are received subsequent to the message.

9. The method of claim 1, wherein the message transmitted to the remote control device further causes one or more light sources on the remote control device to provide a light pattern indicating that the remote control device has been disabled from controlling the media device.

10. The method of claim 1, further comprising:
receiving an identification code that allows the media application to continue presenting the media content item on the media device; and
transmitting a second message to the remote control that activates the remote control for controlling the media device.

11. A system for presenting and inhibiting media content, the system comprising:
a server including a hardware processor, wherein the hardware processor:
receives a request to execute a media application for presenting media content on a media device, wherein the media application is associated with user preference settings that indicate a threshold amount of time for viewing media content and wherein the media device is controlled by a remote control device;
causes presentation of a media content item to begin;
determine whether the timing parameter for viewing media content from the user preference settings has been met; and
in response to determining that the timing parameter for viewing media content has been met, cause the media application executing on the media device to end the presentation of the media content item and transmitting, using the hardware processor, a message to the remote control that disables the remote control from controlling the media device, wherein the message causes the remote control device to indicate a status that the remote control device has been disabled from controlling the media device.

12. A remote control device comprising:
a plurality of keys;
a transmitter that transmits, over a first communication link, first signals to a media device;
a receiver that receives, over a second communication link, signals from a server; and
a hardware processor connected to the plurality of keys, the transmitter, and the receiver, wherein the hardware processor:
transmits, via the transmitter to the media device via the first communication link, an instruction that controls a media application executing on the media device;
concurrently with the media application being inhibited from being used on the media device, receives, via the receiver from the server via the second communication link, a message to disable the remote control device, wherein selections of one or more of the plurality of keys that are received subsequent to receiving the message are not transmitted to the media device via the first communication link; and
disables use of the remote control.

13. The remote control device of claim 12, wherein the first communication link is a Bluetooth link, and wherein the second communication link is a Wi-Fi link.

14. The remote control device of claim 12, wherein the first communication link is a first Wi-Fi link between the remote control device and the media device, and wherein the second communication link is a second Wi-Fi link between the remote control device and the server.

15. The remote control device of claim 12, wherein the hardware processor further:
transmits, via the transmitter to the media device via the first communication link, a first instruction to power on the media device;
receives an indication of a media content item to be presented on the media device; and
transmits, via the transmitter to the media device via the first communication link, the indication of the media content item, wherein the media device begins presenting the media content item in response to receiving the indication.

16. The remote control device of claim 12, wherein the message to disable the remote control further instructs that the media device is to be powered off and wherein the hardware processor further transmits, via the transmitter to the media device via the first communication link, a second instruction to power off the media device.

17. The remote control device of claim 16, wherein the message to disable the remote control and power off the media device is based on user preference settings that indicate a time of day at which the media device is to be powered off, and wherein the message is received at the time of day.

18. The remote control device of claim 17, wherein the user preference settings include first settings corresponding to a first user of the remote control device and second settings corresponding to a second user of the remote control device.

19. The remote control device of claim 16, wherein the message to disable the remote control and power off the media device is based on user preference settings that indicate a threshold amount of time for viewing media content, and wherein the message is received in response to determining that the threshold amount of time for viewing media content has elapsed.

20. The remote control device of claim 16, wherein the message to disable the remote control and power off the media device corresponds to an end of a media content item, and wherein the message is received in response to determining that the media content item has ended.

* * * * *